United States Patent [19]

Stang et al.

[11] 4,325,219

[45] Apr. 20, 1982

[54] TWO LOOP ENGINE COOLANT SYSTEM

[75] Inventors: John H. Stang, Columbus, Ind.; Hiromasa Yamaguchi, Tokyo, Japan

[73] Assignees: Cummins Engine Company, Inc., Columbus, Ind.; Komatsu Ltd., Tokyo, Japan

[21] Appl. No.: 108,821

[22] Filed: Dec. 31, 1979

[51] Int. Cl.³ .............................................. F02B 29/04
[52] U.S. Cl. .................................................... 60/599
[58] Field of Search ............................ 60/599; 123/563

[56] References Cited

U.S. PATENT DOCUMENTS

| | | | |
|---|---|---|---|
| 3,134,371 | 5/1964 | Crooks | 123/563 X |
| 3,872,835 | 3/1975 | Deutschmann | 123/563 X |
| 4,000,725 | 1/1977 | Harris | 123/563 |
| 4,061,187 | 12/1977 | Rajasekaran et al. | 60/599 X |
| 4,180,032 | 12/1979 | Plegat | 123/563 |

FOREIGN PATENT DOCUMENTS

| | | | |
|---|---|---|---|
| 1223196 | 8/1966 | Fed. Rep. of Germany | 60/599 |
| 2057564 | 4/1981 | United Kingdom | 60/599 |

Primary Examiner—Michael Koczo, Jr.
Attorney, Agent, or Firm—Merriam, Marshall & Bicknell

[57] ABSTRACT

This disclosure relates to a coolant system for an internal combustion engine including a turbocharger and an aftercooler. The coolant system comprises an engine loop and an aftercooler loop both utilizing a single pump. The engine loop includes the pump, the engine block and head, a first radiator, and a radiator bypass branch. The aftercooler loop includes the pump, the aftercooler, a second radiator, and a radiator bypass branch. Each loop further includes a temperature responsive flow control thermostat for regulating the coolant flow through the associated radiator and/or bypass branch. The thermostat in the aftercooler loop is mounted in the coolant intake line leading to the aftercooler, but it responds to the temperature of the coolant leaving the aftercooler.

11 Claims, 8 Drawing Figures

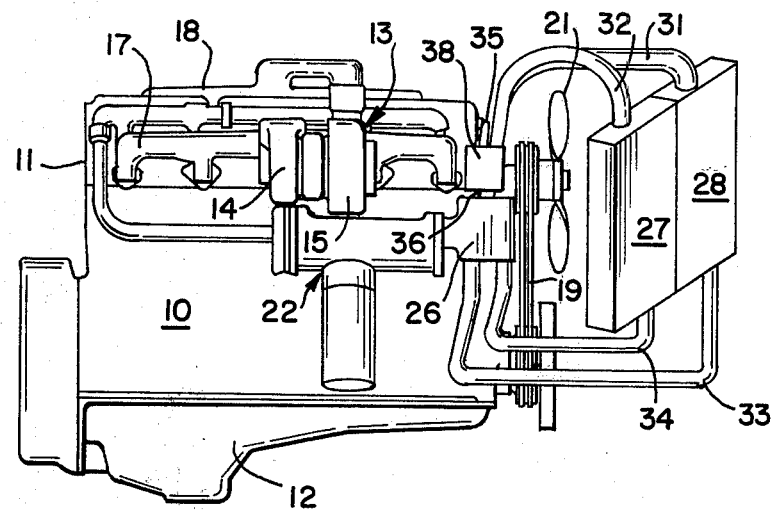
FIG_1_
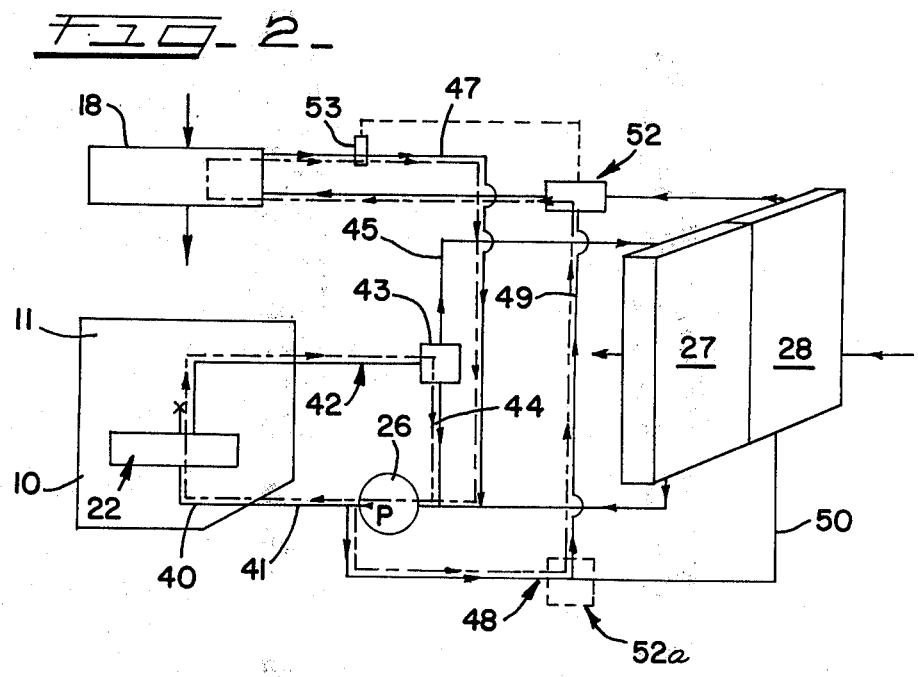
FIG_2_

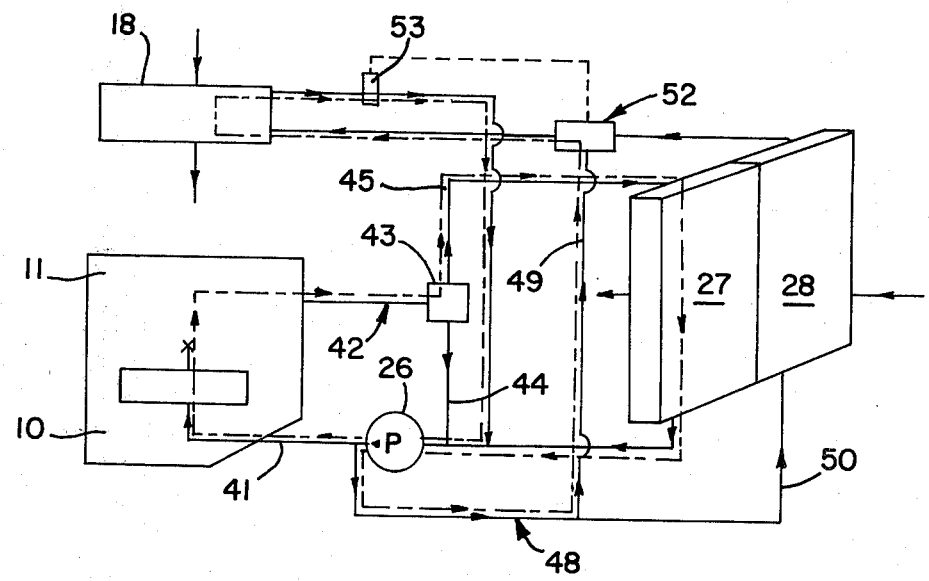
FIG-3-
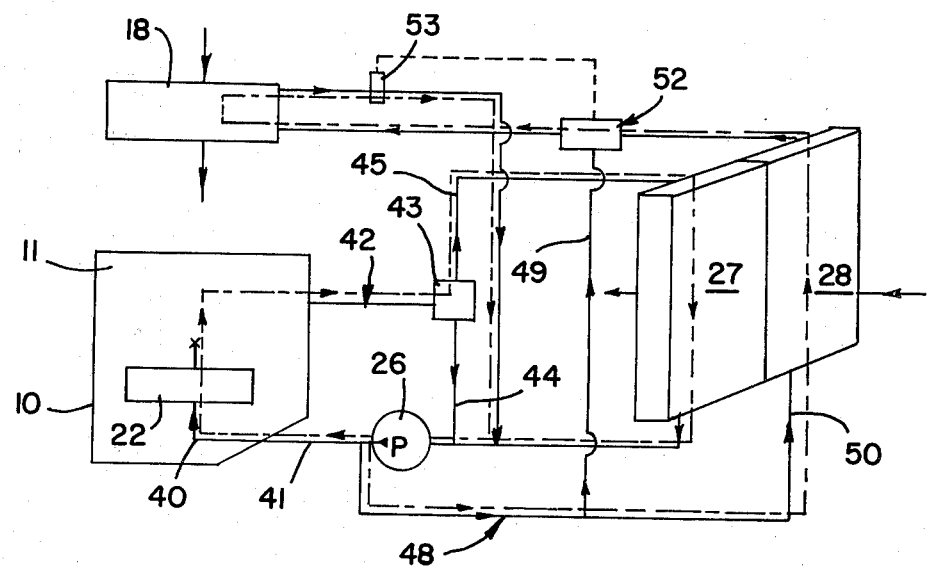
FIG-4-

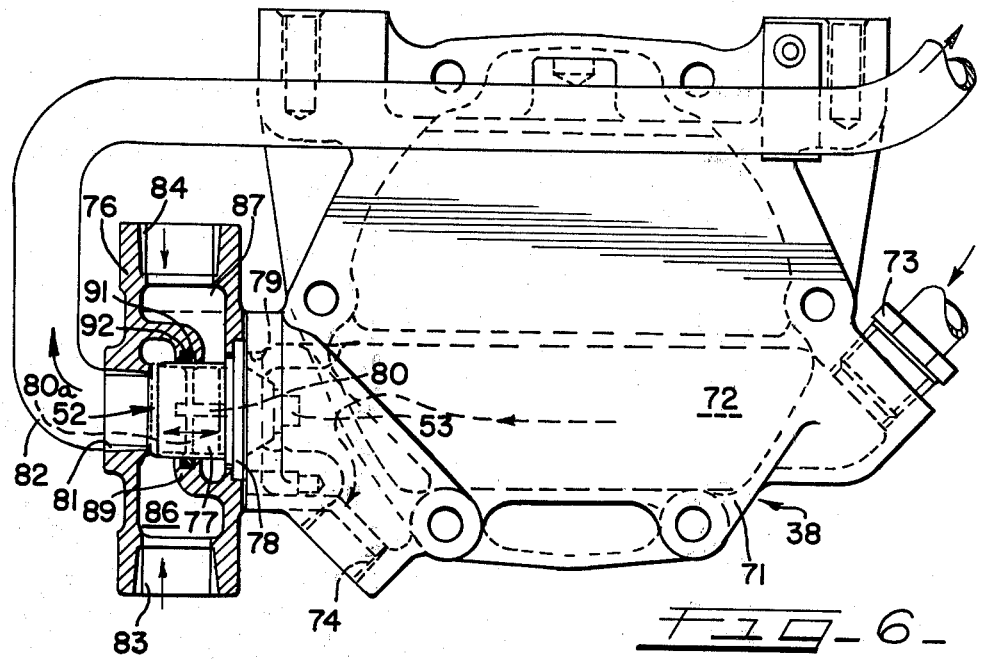
FIG_6
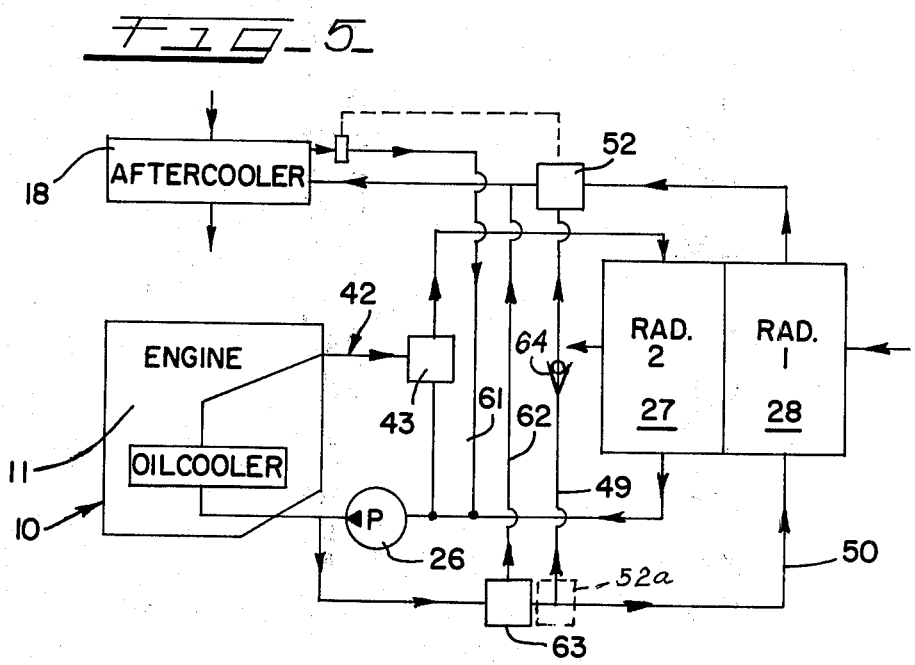
FIG_5

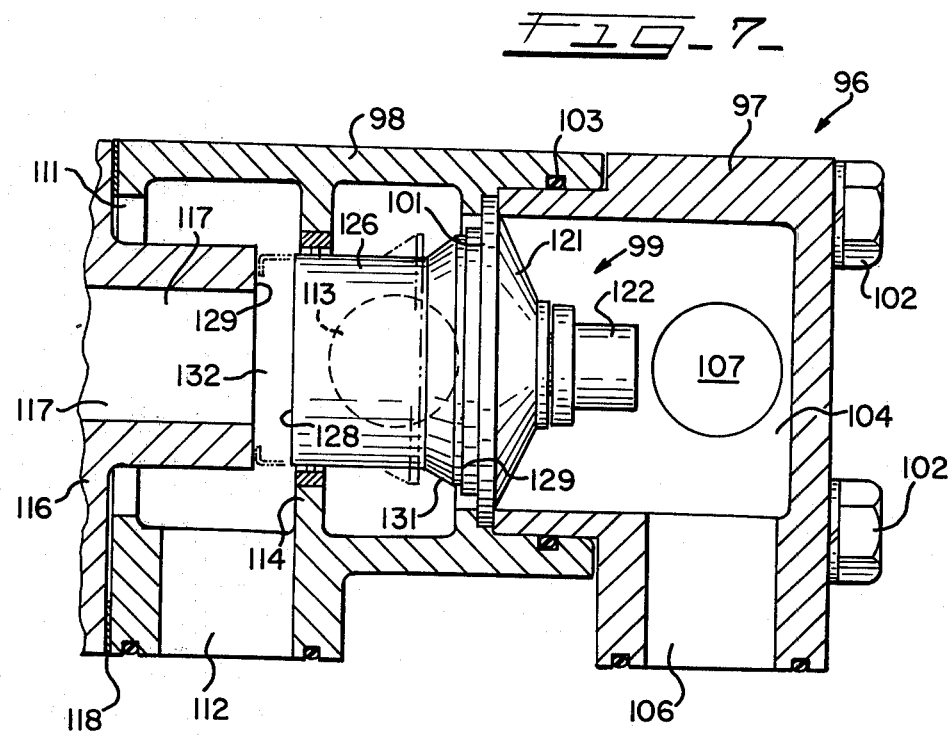
FIG_7_
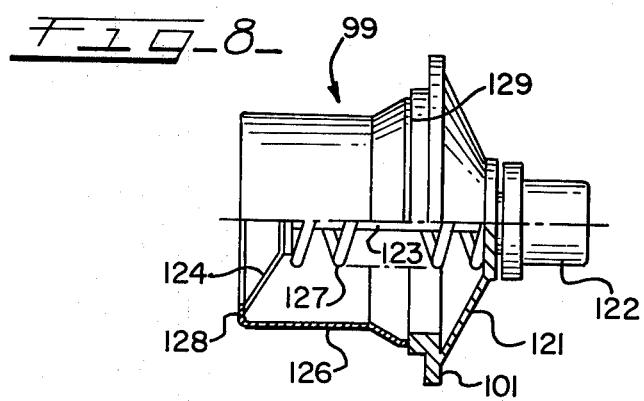
FIG_8_

TWO LOOP ENGINE COOLANT SYSTEM

Internal combustion engines, such as diesel engines for trucks, are increasingly being equipped with turbochargers. When running at rated power, the turbocharger supplies an increased amount of intake air at a pressure boost and thereby improves the engine performance. However, the compressor of the turbocharger also heats the intake air, and this is a disadvantage when operating at high power output levels. This disadvantage has been partially avoided by providing the engine with an aftercooler which is mounted between the compressor and the intake manifold. In the usual arrangement, the aftercooler is a liquid cooled heat exchanger that removes some of the heat from the intake air.

Arrangements have proposed wherein the aftercooler is connected in the engine coolant system in order to avoid having two separate liquid cooling systems in an engine. Further, U.S. Pat. No. 3,872,835 and German Pat. No. 1,223,196 show engines wherein a single coolant pump circulates the engine coolant through the engine block and head, through an aftercooler, and through engine radiators.

While it is advantageous to cool the air during running conditions, the air should not be cooled at engine start up and during idle or low power conditions. If the intake air is too cool, problems arise due to noxious emissions, such as unburnt hydrocarbons and white smoke.

It is a general object of the present invention to provide an improved two-loop engine cooling system that cools the intake air during running conditions and warms the air during low power conditions. The engine includes a single coolant pump and two cooling loops, one loop passing through the engine block and head and a first radiator and the other loop passing through the aftercooler and a second radiator. Each loop further includes a by-pass branch around the radiator, and a flow control thermostat. The thermostat that regulates the temperature of the coolant entering the aftercooler, responds to the temperature of the coolant leaving the aftercooler. During engine warm up and low load conditions, heat is transferred to the intake air from the coolant, and during normal running conditions heat is removed from the intake air.

The foregoing and other objects and advantages of the present invention will become more apparent from the following detailed description taken in conjunction with accompanying figures of the drawings, wherein:

FIG. 1 is a view of an engine including a cooling system in accordance with the present invention;

FIGS. 2 through 4 are diagrammatic views illustrating the coolant system and its operation;

FIG. 5 is a diagrammatic view of an alternative form of the system;

FIG. 6 illustrates a preferred thermostat mounting arrangement.

FIG. 7 illustrates an alternative thermostat mounting arrangement; and

FIG. 8 illustrates a thermostat for use in the system.

While the following description deals with a diesel engine for use, for example, in a truck, it should be understood that the invention is also applicable to other types of engines.

With reference first to FIG. 1, the engine includes a block 10, a head 11 and a crankcase 12. A turbocharger 13 including a turbine 14 and a compressor 15 are provided on one side of the engine, the turbine being connected to an exhaust manifold 17 of the engine. The compressor output is connected to an aftercooler 18, the intake air passing through the aftercooler before flowing to the air intake manifold (not shown) on the opposite side of the engine. The engine further includes a crankshaft that is connected to turn engine belts 19 which drive a cooling fan 21. An oil cooler and filter assembly 22 is mounted on one side of the engine, the oil cooler being the type, in the specific example illustrated and described herein, wherein the coolant is passed through it in order to cool the oil.

The coolant system includes a pump 26 which is mounted on one side of the engine and which is driven by the engine crankshaft, and first and second radiators 27 and 28. A plurality of coolant lines or hose indicated by the numerals 31 through 36 interconnect the parts of the coolant system. The lines 33 and 34 connect the radiators with the pump 26, and the lines 31 and 32 connect the radiators with a flow control unit 38 and with the passage from the head. The unit 38 is connected by the line 36 to the pump 26 and by two lines 35 to the aftercooler 18.

The diagrams shown in FIGS. 2 through 4 illustrate the coolant system and its operation in greater detail. The coolant flow lines are given numbers different from those in FIG. 1 in order to clarify the description of FIGS. 2 through 4.

The engine block 10 and the head 11 include flow passages 40, and the oil cooler 22 is connected to the pump 26 and the passage 40. The inlet end of the passage 40 of the block 10 is connected to the outlet of the pump 26 by a line 41, and another line 42 is connected to the outlet of the passage 40 and returns the coolant to the intake of the pump 26. The line 42 has a flow control valve or thermostat 43 connected in it, and the line 42 is divided into two branches 44 and 45 leading from the thermostat 43. The branch 44 extends from the thermostat 43 directly to the pump 26 whereas the branch 45 extends through the radiator 27 and then to the pump intake. The valve 43 is designed in a conventional manner to switch at a temperature level of for example, between 205° to 220°. At temperatures below this level, the coolant flows from the head 11 directly to the pump intake, whereas when the coolant temperature is above this level, the coolant flows through the radiator 27 before going to the pump. At temperatures around this level, the thermostat 43 modulates and the coolant leaving the head 11 may flow through both branches 44 and 45.

Another coolant line 47 connects the outlet of the aftercooler 18 to the intake of the pump 26, and still another line 48 connects the outlet of the pump 26 to the inlet of the aftercooler 18. Part of the line 48 is also divided into two branches 49 and 50, the branch 50 extending through the radiator 28. The branch 49 and the outlet of the radiator 28 are connected to a second flow control valve or thermostat 52 which controls the flow of the coolant through the branches 49 and 50 and to the inlet of the after-cooler 18. In the present example, the thermostat 52 is designed to switch at a temperature level of approximately 180°. At temperatures below this level, the thermostat 52 directs the coolant flow from the pump 26 through the bypass branch 49 and to the aftercooler 18. At temperatures above this level the thermostat 52 directs the coolant flow through the branch 50 and the radiator 28 and then to the aftercooler 18.

While the thermostat 52 is connected in the line leading to the aftercooler 18, it is controlled by a temperature sensor 53 that is connected in the line 47 at the output of the aftercooler 18, and consequently it responds to the temperature of the coolant leaving the aftercooler 18. The other thermostat 43 of course responds to the temperature of the coolant entering it.

Thus, the system includes an engine loop and an aftercooler loop, and the pump 26 is common to both loops. The engine loop includes the passages 41, 40 and 42, the radiator 27, and the radiator bypass branch 44. The aftercooler loop includes the lines 47 and 48, the aftercooler 18, the radiator 28, and the radiator bypass branch 49. Most of the coolant flow is through the engine loop, and the coolant of the two loops combine and mix in the pump 26. Separate controls 43 and 52 are provided in the two loops, which hold the temperatures at different temperature levels.

FIGS. 2, 3 and 4 illustrate the operation of the cooling system under three different engine operating conditions. The dashed lines in these three figures indicate the paths of flow of the coolant. The paths indicated in FIG. 2 exist when the engine and the coolant temperature are relatively low, as when it is being started or warmed up. FIG. 3 illustrates the flow paths when the engine and the coolant are warmer than in the situation shown in FIG. 2, which may occur during low power conditions of the engine. FIG. 4 illustrates the flow paths when the engine is operating at rated power conditions.

With specific reference to FIG. 2, assume that the engine has just been started and is warming up. The turbocharger 13 is not driven because of the absence of a large volume of hot exhaust gases, and consequently the air entering the aftercooler 18 is at essentially ambient temperature and pressure. The engine and the coolant are also at essentially ambient temperature. The coolant leaving the pump 26 flows through the engine loop including the line 41, the block 10, the head 11 and the thermostat 43. Since the coolant temperature is relatively low and is below the switching temperature, the thermostat 43 directs the coolant through the branch 44, thereby bypassing the radiator 27. Consequently, the coolant flowing through the engine block and head is not cooled by the radiator, allowing the engine to warm up quickly.

The coolant leaving the pump 26 also flows through the aftercooler loop. Since the coolant temperature is relatively low and the intake air flowing through the aftercooler 18 is also relatively low, the thermostat 52 directs the coolant flow through the radiator bypass branch 49. Some of the coolant leaving the head 11 and flowing through the branch 44 is pumped into the line 48. As soon as the engine has started and is warming up, the coolant leaving the head 11 is warmed and part of the warmed coolant leaving the pump 26 enters the branch 49 and flows through the aftercooler 18. This coolant is warmer than the ambient air temperature and it heats the intake air flowing through the aftercooler. This is advantageous because the warmed combustion air aids in the combustion process in the engine cylinders.

FIG. 3 illustrates the flow paths after the engine has warmed up but is operating at relatively low power. The turbocharger runs at low speed and does not appreciably compress and heat the intake air. The coolant leaving the head 11 of the engine is relatively hot and it is above the switching temperature of the thermostat 43, and consequently the thermostat 43 directs the coolant to the branch 45 and through the radiator 27. The thermostat 43 modulates and tends to hold the coolant temperature in the 205° to 220° range by varying the proportions of the coolant flowing through the two branches 44 and 45. The heated coolant leaving the pump 26 flows through the line 48 and through the branch 49, and it flows through the aftercooler 18 and heats the intake air moving through the aftercooler. Sufficient heat is removed by the intake air from the coolant in the aftercooler that it is below the switching temperature of the thermostat 52, and consequently the thermostat 52 directs the coolant through the branch 49 and bypasses the radiator 28. Thus the air is heated by the aftercooler 18 and such heating improves the combustion process.

FIG. 4 illustrates the conditions when the engine is operating at rated power. The heated coolant from the engine block flows through the thermostat 43 and through the radiator 27 in order to reduce the temperature of the engine. The thermostat 52 directs the coolant through the branch 50 where it is cooled by the radiator 28 and then into the aftercooler 18. The air leaving the turbocharger compressor 15 is relatively hot but it is cooled as it flows through the aftercooler 18 before entering the engine cylinders.

In the specific example being described, the capacity of the radiator 27 is much larger than the capacity of the radiator 28 and most of the coolant flows through the radiator 27. When operating at rated power, the temperature of the coolant leaving the radiator 27 is around 207°. The temperature of the air leaving the compressor of the turbocharger and entering the aftercooler is at approximately 305° to 310°. Assuming that the coolant is flowing through the branch 50 and the radiator 28, the temperature of the coolant leaving the radiator 28 and entering the aftercooler 18 is at approximately 115°, the temperature having been cooled down from approximately 205° by the radiator 28. The coolant flowing through the aftercooler 18 is heated by the air flowing through it and the temperature of the coolant flowing past the sensor 53 is at approximately 180°. The heat removed from the air drops the air temperature from about 310° to approximately 140°.

Instead of locating the thermostat 52 as shown in FIGS. 1 to 4, it may instead be located at the dashed line position 52a shown in FIG. 2 where it is just upstream of the two branches 49 and 50, and essentially the same operation will result.

In the alternative form of the invention illustrated in FIG. 5, the coolant system is generally similar to that illustrated in FIGS. 1 through 4, and therefore the same reference numerals are employed to indicate the engine block and head 10 and 11, the aftercooler 18, the radiators 27 and 28 and the pump 26. The difference between the FIG. 5 system and the previously described system is that another line 62 is connected in parallel with and upstream of the branches 49 and 50. The line 62 includes a third flow control valve or thermostat 63 that is located between the outlet of the pump 26 and the two branches 49 and 50. The thermostat is designed to switch at a lower temperature, such as about 160° F., than the thermostat 52. When the temperature of the coolant leaving the pump 26 is lower than this temperature, all of the coolant is directed through the line 62 and the two branches 49 and 50 are bypassed. Thus, the thermostat 63 ensures that no coolant will flow through the radiator 28 while the engine temperature is low, and it prevents overcooling of the engine. A check valve 64 is preferably connected in the line 49 to prevent reverse flow of the coolant when the thermostat 63 is open. Instead of connecting the thermostat 52 at the location shown in solid lines in FIG. 5, it could instead be located at the dashed line position indicated by the numeral 52a.

FIG. 6 illustrates the preferred construction of a control unit 38 which may be used in either of the foregoing forms of the invention. The unit 38 includes a housing 71 forming a flow chamber 72. A hose or tube connector 73 is attached to the housing 71 for connecting the chamber 72 with the outlet of the aftercooler, so that the coolant leaving the aftercooler flows through the chamber 72. At the other end of the housing 71 is formed an outlet 74 which is adapted to receive a tube (not shown in FIG. 6) for connecting the chamber 72 to the intake of the pump. Thus, the coolant leaving the aftercooler flows through the chamber 72 and then to the pump.

If desired, an engine accessory such as an air compressor may also be connected in the line between the aftercooler and the pump and in series with the chamber 72. The statement that the chamber 72 receives the coolant flow from the aftercooler and that the sensor 52 responds to the temperature of the coolant leaving the aftercooler is considered to include the arrangement where an accessory is connected in the line between the connector 73 and the aftercooler as mentioned above. If such an accessory does not appreciably change the temperature of the coolant flowing through it, the temperature of the coolant entering the chamber 72 is essentially that of the coolant leaving the aftercooler. For example, if the coolant is passed through the head of an air compressor of the engine, the coolant will be heated only by about 0.5° F., and thus it has a minimal effect on the operation of the coolant system.

Attached to one side of the housing 71 is a thermostat casing 76 that houses the thermostat 52 and the sensor 53. The thermostat 52 includes a tubular movable sleeve 77 and a flange 78 that is secured between adjoining surfaces of the housing 71 and the casing 76. The thermostat 52 is mounted in openings 79 formed in the casing 76 and the housing 71, and the sensor 53 extends through the openings 79 and into the chamber 72. Consequently, the coolant flowing through the chamber 72 flows around the sensor 53. The sleeve 77 is supported by a rod 80 and a spider 80a. The rod 80 extends down the center of the sleeve and it is supported by the flange 78, and the spider 80a is secured to the rod 80 and to the inner surface of the tubular sleeve 77. The rod 80 is connected to and is moved by the sensor 53. As an example, the sensor 53 may contain a quantity of wax that melts at the switching temperature of the thermostat. When the coolant temperature rises above the switching temperature, the wax melts and expands, and this expansion moves the rod 80 and the sleeve 79 to the left to the position shown in dashed lines in FIG. 6. When the coolant temperature drops, the wax solidifies and shrinks, and a return spring (not shown) in the sensor moves the rod 80 and the sleeve toward the right to the position shown in solid lines in FIG. 6. Thus, the sleeve 77 is movable toward and away from the sensor 53, relative to the flange 78 and the casing 76.

Generally coaxial with the sleeve 77 and with its axis of movement is an opening 81 which is adapted to receive a tube 82 that is also attached to the inlet of the aftercooler. The casing 76 has two additional flow openings 83 and 84 formed in it, the opening 83 being coupled to the output of the pump 26 and the line 49 and the opening 84 being coupled to the radiator 28 outlet. The openings 83 and 84 respectively connect with flow chambers 86 and 87 formed in the casing 76, the chambers 86 and 87 being separated by a wall 89. The sleeve 77 extends through a hole 91 formed in the wall 89 and an O-ring 92 forms a seal between the wall 89 and the sleeve 77.

When the sleeve 77 is in the solid line position shown in FIG. 6, the coolant flows from the chamber 86 and through the space between the left end of the sleeve 77 and the adjacent side of the casing 76. When the sleeve 77 is in the dashed line position, the coolant flows from the chamber 87, through the space between the right hand end of the sleeve and the flange 78, and through the center of the sleeve. When the sleeve is intermediate the two positions shown, there is flow from both of the chambers 86 and 87 to the line 82. Thus, the aftercooler outlet coolant temperature controls the proportions of the coolant flowing from the two openings 83 and 84 to the opening 81 and, eventually, to the aftercooler.

FIGS. 7 and 8 illustrate another construction of a flow control unit 96 which is usable in any of the foregoing systems. With reference to FIG. 7, the control unit 96 includes a housing formed by two parts 97 and 98 for a thermostat 99. The thermostat 99 includes an annular flange 101 that is clamped between the two parts 97 and 98, bolts 102 being employed to secure the housing parts together. An O-ring 103 forms a seal between the two parts. The housing part 97 forms a chamber 104, and coolant flows from an inlet 106, through the chamber 104, and to an outlet 107. The housing part 98 includes an inlet opening 111, a first outlet 112 and a second outlet 113. An internal wall 114 separates the two outlets 112 and 113. A member 116 is secured to the part 98 over the inlet 111, and a passage 117 of the part 116 feeds coolant to the interior of the part 98. Means such as a gasket 118 is provided to seal the joint between the parts 98 and 116.

When connected in the system shown in FIG. 2, the inlet 106 is connected to the aftercooler 18 outlet and the outlet 107 is connected to the intake of the pump 26. The passage 117 receives coolant from the pump 26 outlet line 48, the outlet 113 is connected to the line 50 leading to the radiator 28, and the outlet 112 is connected to the intake of the aftercooler 18. Thus the unit 96 shows the thermostat 99 connected in the location indicated by the dashed line thermostat 52a in FIG. 2.

The thermostat 99 shown in FIGS. 7 and 8 includes a solid conical wall 121 that has the flange 101 formed at its outer edge. A sensor 122 is mounted at the center of the wall 121 and extends into the chamber 104. A rod 123 is connected to the sensor 122 and extends axially of the thermostat, and a spider 124 is secured to the other end of the rod 123. A hollow cylindrical part 126 is supported by the spider 124 and surrounds the rod 123 and a coiled spring 127 which urges the part 126 toward the right as seen in FIGS. 7 and 8.

With reference to FIG. 7, the sensor 122, when relatively hot, moves the rod 123, the spider 124 and the part 126 toward the left to the dashed line position. In this position, the left end surface 128 of the part 126 engages a right end surface 129 of the part 116. In this position, the right end surface 129 of the part 126 is spaced from the wall 121 and an opening 131 is formed between the parts 121 and 126.

When the sensor 122 is relatively cool, the part 126 is in the solid line position shown in FIG. 7 where the surface 129 engages the wall 121 and an opening 132 is formed between the the surfaces 128 and 129.

Thus, the aftercooler outlet temperature operates the sensor 122 which in turn moves the part 126. When the sensor 122 is hot, the coolant flows from the inlet 117, through the space 131 and to the outlet 113, and when the sensor 122 is relatively cool the coolant flows through the space 132 to the outlet 112. Of course, the part 126 may also be in intermediate positions so that the flow is directed to both outlets 112 and 113.

It will be apparent from the foregoing that the apparatus described herein is highly advantageous. Even though only one engine driven pump is required, the apparatus provides coolant flow through two loops, one loop being at one temperature and including the engine block and the other loop being at another temperature and including the aftercooler. The arrangements described herein make it possible to heat the intake air at light loads and to cool the intake air at higher engine loads and temperatures. This results in improved engine performance and in reduced noxious emissions. The coolant temperature at the outlet of the aftercooler 18 is influenced both by the temperature of the coolant flowing through the aftercooler and by the temperature of the intake air flowing through the aftercooler. Consequently, the thermostat 52 is made responsive to both the coolant temperature and the air temperature by reason of the sensor 53 being at the outlet of the aftercooler. In the present arrangement, at light loads the system attempts to hold the coolant temperature at the aftercooler outlet at a relatively constant value. The system cools the intake air at rated load but nevertheless the coolant does not cool the intake air but instead warms it. By providing separate loops and a control in each loop, it is possible to keep the engine hot while adjusting the air cooling requirements.

I claim:

1. A coolant system for an internal combustion engine including an aftercooler for cooling the intake air flowing into the engine, said aftercooler having a coolant intake and a coolant outlet, and said engine including a block and a head, said coolant system comprising an engine loop and an aftercooler loop, a pump having an output, both of said loops including said pump, said engine loop including said pump, the engine block and head, a first radiator, and a first radiator bypass, said aftercooler loop including said pump, said intake of the aftercooler being connected to said output of said pump, a second radiator and a second radiator bypass connected to said inlet of said aftercooler, each of said loops further including a temperature responsive flow control thermostat for regulating the coolant flow through the associated radiator and said bypass, said thermostat in said aftercooler loop including a sensor located in said coolant outlet to sense the temperature of the coolant leaving said aftercooler.

2. Apparatus as in claim 1, wherein said second radiator and said second radiator bypass are connected in parallel and are connected between the output of said pump and said coolant intake of said aftercooler.

3. Apparatus as in claim 2, wherein said thermostat of said aftercooler loop is connected between said coolant intake of said aftercooler and said parallel connection of said second radiator and said second radiator bypass.

4. Apparatus as in claim 2, wherein said thermostat of said aftercooler loop is connected between said output of said pump, said parallel connection of said second radiator and said second radiator bypass.

5. Apparatus as in claim 1, wherein said thermostat of said engine loop includes temperature responsive means for switching in a preset temperature range, and said thermostat of said aftercooler loop includes temperature responsive means for switching in a preset temperature range that is lower than said temperature range of said thermostat of said engine loop.

6. Apparatus as in claim 1, and further including a coolant flow passage in said aftercooler loop, said passage being in parallel with and upstream of said second radiator and said second radiator bypass, and a third thermostat connected in said passage, each of said thermostats switching at a preset temperature range, and said range for said third thermostat being lower than said ranges for the other of said thermostats.

7. Apparatus as in claim 1, wherein said engine loop includes flow passages and said intercooler loop includes flow passages, and the flow capacity of said passages of said engine loop are substantially greater than the flow capacity of said passages of said aftercooler loop.

8. A coolant system of an internal combustion engine including an aftercooler, said system comprising a coolant pump, coolant flow lines connecting the intake and outlet of said pump with the intake and outlet of said aftercooler, whereby the coolant is pumped in a loop including the aftercooler, the pump, and said flow lines, one of said lines being formed by a radiator branch and by a bypass branch in parallel with said radiator branch, said system further including a temperature responsive flow control thermostat connected to said branches at said intake of said aftercooler for regulating the coolant flow through said radiator branch and said bypass branch, said thermostat including a sensor located to respond to the temperature of the coolant adjacent the outlet of said aftercooler.

9. A coolant system as in claim 8, wherein said branches are in said line between said pump outlet and said aftercooler intake.

10. A coolant system for an internal combustion engine having an aftercooler, the engine and the aftercooler having coolant flow passages therein, said coolant system comprising:

(a) a coolant pump including an intake and outlet,
(b) a first line connecting said pump outlet with the engine passages,
(c) a second line connecting the engine passage with the said pump intake, said second line comprising first and second branches, a first heat exchanger connected in said first branch, first valve means connected in said second line for controlling the flow of coolant through said first and second branches, said first valve means responding to the coolant temperature in said second line and directing coolant through said first branch at elevated temperatures and directing coolant through said second branch at reduced temperatures,
(d) a third line connecting said pump intake with an outlet end of said aftercooler, and
(e) a fourth line connecting said pump outlet with the inlet end of said aftercooler, said fourth line comprising third and fourth branches, a second heat exchanger connected in said third branch, second valve means connected in said fourth line for controlling the flow of coolant through said third and fourth branches to said inlet end of said aftercooler, said second valve means including sensor means responding to the coolant temperature leaving said outlet end of said aftercooler and directing coolant flow through said third branch at elevated temperatures and directing coolant flow through said fourth branch at reduced temperatures.

11. An internal combustion engine comprising a block and head having combustion chambers and coolant passages therein, a pump, a first radiator and a first radiator bypass, flow lines connecting said pump with said passages, said radiator and said radiator bypass, a turbocharger connected to supply intake air to the combustion chambers of said engine, first temperature responsive flow control means connected to regulate the flow of coolant through said first radiator and said first radiator bypass, an aftercooler mounted in the intake air flow path between said turbocharger and said chambers, coolant flow passages in said aftercooler and said passages including an intake and an outlet, a second radiator and a second radiator bypass, flow lines connecting said pump with said aftercooler, said second radiator, and said second radiator bypass, and second temperature responsive flow control means connected in said intake to regulate the flow of coolant through said second radiator and said second radiator bypass, said second flow control means including sensor means connected in said outlet and responsive to the temperature of the coolant leaving said aftercooler.

* * * * *